United States Patent
Ogawa

(10) Patent No.: US 10,413,976 B2
(45) Date of Patent: Sep. 17, 2019

(54) DRILL AND METHOD OF MANUFACTURING MACHINED PRODUCT USING THE SAME

(71) Applicant: Kyocera Corporation, Kyoto-shi, Kyoto (JP)

(72) Inventor: Hiroshi Ogawa, Omihachiman (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/747,776

(22) PCT Filed: Jul. 28, 2016

(86) PCT No.: PCT/JP2016/072150
§ 371 (c)(1),
(2) Date: Jan. 26, 2018

(87) PCT Pub. No.: WO2017/018478
PCT Pub. Date: Feb. 2, 2017

(65) Prior Publication Data
US 2018/0243840 A1    Aug. 30, 2018

(30) Foreign Application Priority Data
Jul. 29, 2015  (JP) ................................ 2015-149736

(51) Int. Cl.
*B23B 51/02* (2006.01)
(52) U.S. Cl.
CPC .......... *B23B 51/02* (2013.01); *B23B 2226/31* (2013.01); *B23B 2251/08* (2013.01);
(Continued)

(58) Field of Classification Search
CPC .......................... B23B 51/02; B23B 2251/122
See application file for complete search history.

(56) References Cited

U.S. PATENT DOCUMENTS

| 1,859,202 | A | * | 5/1932 | Emmons | ............... B23B 31/005 |
|---|---|---|---|---|---|
|  |  |  |  |  | 175/395 |
| 2,966,081 | A |  | 12/1960 | Kallio |  |

(Continued)

FOREIGN PATENT DOCUMENTS

| DE |  | 570667 C | * | 2/1933 | ............. B23B 51/02 |
|---|---|---|---|---|---|
| DE |  | 3336018 A1 |  | 4/1985 |  |

(Continued)

OTHER PUBLICATIONS

Proquest Machine Translation of JP 2008-296313, printed Jan. 2019.*

(Continued)

*Primary Examiner* — Eric A Gates
(74) *Attorney, Agent, or Firm* — Viering, Jentschura & Partner MBB

(57) ABSTRACT

In an embodiment, a drill includes a bar-shaped body rotatable around a central axis. The body includes a first surface located at a first end, a second surface intersecting with the first surface on a front side in a rotation direction, and a cutting edge located at an intersection of the first surface and the second surface. The second surface includes a first region located along the cutting edge, and a second region located on a front side in the rotation direction with respect to the first region. The second surface has a concave shape in a cross section orthogonal to the central axis.

8 Claims, 13 Drawing Sheets

(52) U.S. Cl.
CPC ..... *B23B 2251/122* (2013.01); *B23B 2251/40* (2013.01); *Y10T 408/9097* (2015.01)

(56) References Cited

U.S. PATENT DOCUMENTS

| | | | |
|---|---|---|---|
| 3,387,511 A * | 6/1968 | Ackart, Sr. | B23B 51/02 408/230 |
| 7,861,807 B2 * | 1/2011 | Probst | B23B 51/02 175/415 |
| 8,579,557 B2 * | 11/2013 | Arai | B23B 51/02 408/227 |
| 9,539,652 B2 * | 1/2017 | Sampath | B23B 51/02 |
| 2007/0134071 A1 * | 6/2007 | Reinhardt | B23B 51/02 408/230 |
| 2012/0201619 A1 | 8/2012 | Olsson | |
| 2016/0243625 A1 | 8/2016 | Waki et al. | |
| 2016/0256937 A1 * | 9/2016 | Guter | B23B 51/02 |

FOREIGN PATENT DOCUMENTS

| | | | | |
|---|---|---|---|---|
| DE | 102005003496 A1 | * | 7/2006 | ............ B23B 51/02 |
| JP | H04275812 A | | 10/1992 | |
| JP | H10156613 A | | 6/1998 | |
| JP | 2000005913 A | | 1/2000 | |
| JP | 2003251512 A | * | 9/2003 | |
| JP | 2008296313 A | * | 12/2008 | |
| JP | 2009018360 A | * | 1/2009 | |
| JP | 2014040002 A | | 3/2014 | |
| JP | 2014083646 A | | 5/2014 | |
| WO | 2015046573 A1 | | 4/2015 | |

OTHER PUBLICATIONS

International Search Report based on Application No. PCT/JP2016/072150 (2 Pages) dated Oct. 11, 2016.

* cited by examiner

US 10,413,976 B2

DRILL AND METHOD OF MANUFACTURING MACHINED PRODUCT USING THE SAME

RELATED APPLICATIONS

The present application is a national stage entry according to 35 U.S.C. § 371 of PCT application No.: PCT/JP2016/072150 filed on Jul. 28, 2016, which claims priority from Japanese application No.: 2015-149736 filed on Jul. 29, 2015, is incorporated herein by reference in its entirety.

TECHNICAL FIELD

The present embodiment relates to a drill for use in a cutting process, and a method of manufacturing a machined product.

BACKGROUND ART

As a drill for use in a cutting process of a workpiece, such as a metal member, a drill described in Japanese Unexamined Patent Publication No. 2000-5913 (Patent Document 1) has conventionally been known. In general, a rake surface whose rake angle has a positive value is disposed along a cutting edge. In the drill described in Patent Document 1, a negative land is disposed along a cutting edge as a rake surface whose rake angle has a negative value.

SUMMARY

In an embodiment, a drill includes a bar-shaped body. The body extends from a first end to a second end, and is rotatable around a central axis. The body includes a first surface located at the first end, a second surface intersecting with the first surface on a front side in a rotation direction of the body, and a cutting edge located in at least a part of an intersection of the first surface and the second surface. The second surface includes a first region located along the cutting edge, and a second region located on a front side in the rotation direction with respect to the first region. The second surface has a concave shape in a cross section orthogonal to the central axis.

EMBODIMENTS

<Drill>

Figure 1:
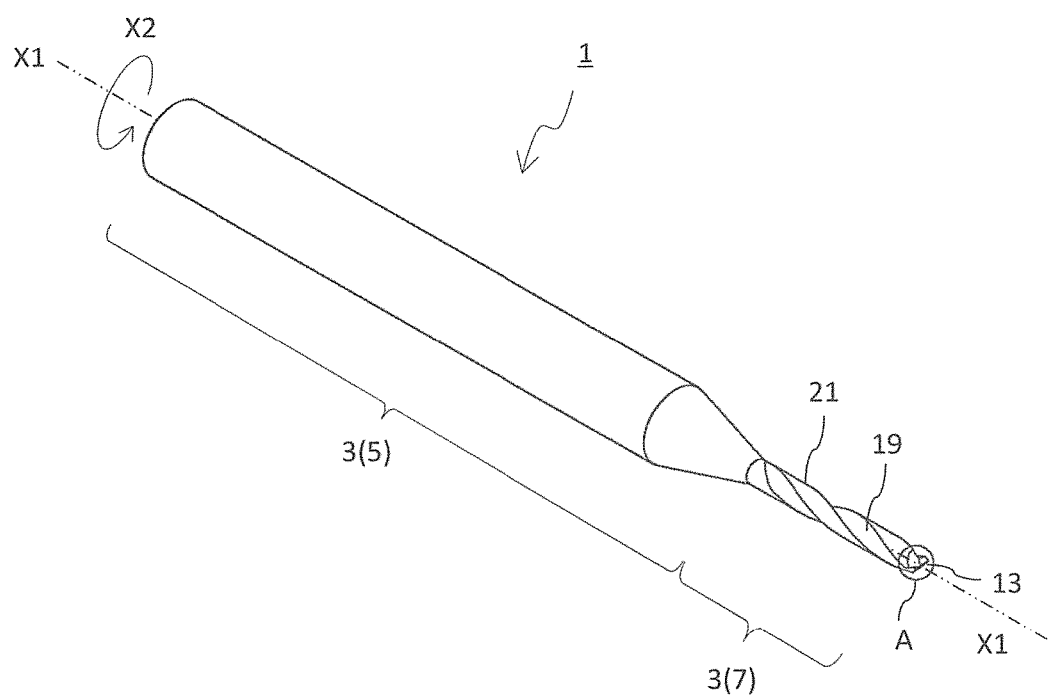
FIG. 1 is a perspective view illustrating a drill in one embodiment.

A drill 1 in an embodiment is described in detail below with reference to the drawings. For the sake of description, the drawings referred to in the following illustrate, in a simplified form, main members from among members constituting the present embodiment. The drill of the present invention is therefore capable of including any structural member not illustrated in the drawings referred to. Sizes of the members in each of the drawings are not ones which faithfully represent the actual structural members and size ratios of these members.

As illustrated in FIG. 1, the drill 1 of the present embodiment includes a bar-shaped body 3 extending along a central axis X1 and from a first end to a second end. The body 3 is rotatable around the central axis X1, and rotates around the central axis X1 during a process of cutting a workpiece for manufacturing a machined product. Arrow X2 in FIG. 1 and the like indicates a rotation direction of the body 3. Therefore, the central axis X1 may be replaced with a rotation axis.

Hereinafter, for the sake of convenience, one in a direction along the central axis X1 is referred to as "a first end," and the other is referred to as "a second end." In general, the first end is referred to as "a front end," and the second end is referred to as "a rear end."

The body 3 includes a holding part 5 referred to as a shank, and a cutting part 7 referred to as a body. The holding part 5 is a member designed to be held by a spindle of a tool machine (not illustrated), or the like. Therefore, the shape of the holding part 5 is designed according to a shape of the spindle. The cutting part 7 is located closer to a side of the first end than the holding part 5. The cutting part 7 is a member which is brought into contact with a workpiece and has a major role in the cutting process of the workpiece.

Figure 2:
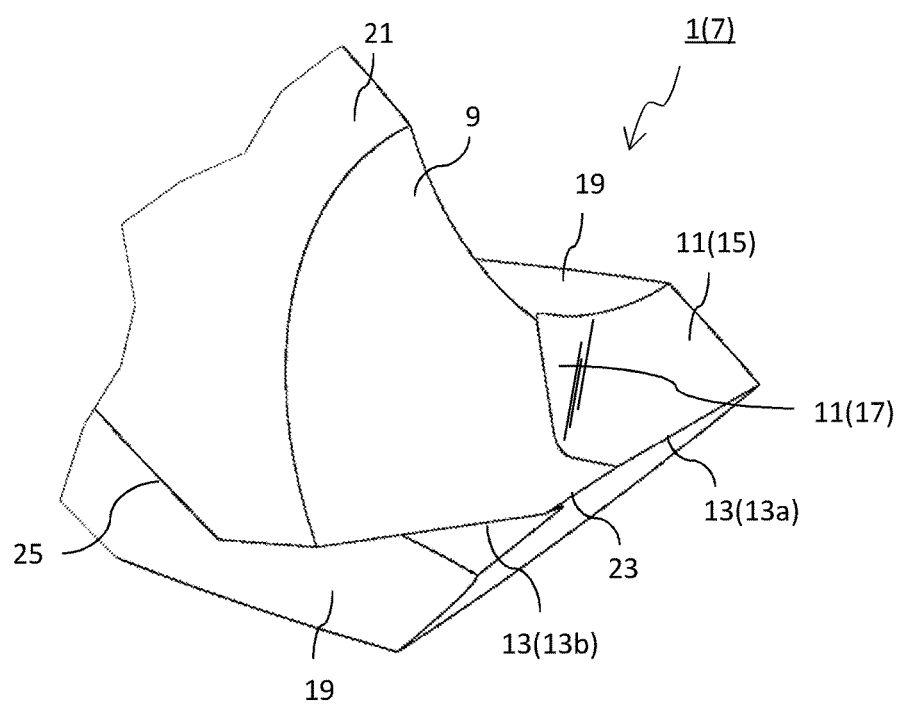
FIG. 2 is an enlarged view of a region A illustrated in FIG. 1.

The cutting part 7 in the present embodiment includes a first surface 9 located at the first end, a second surface 11 intersecting with the first surface 9, and a cutting edge 13 as illustrated in FIG. 2. The first surface 9 is a region generally referred to as a flank surface. The second surface 11 intersects with the first surface 9 on a front side in the rotation direction of the body 3. The second surface 11 is a region generally referred to as a rake surface.

The cutting edge 13 is located in at least a part of an intersection of the first surface 9 and the second surface 11. The cutting edge 13 may be located over the entirety of the intersection of the first surface 9 and the second surface 11, or alternatively may be located in only a part of the intersection of the first surface 9 and the second surface 11. The cutting edge 13 in the present embodiment is an edge having a major role in the cutting process of the workpiece, and hereinafter referred to as a major cutting edge 13 for the sake of convenience.

Figure 7:
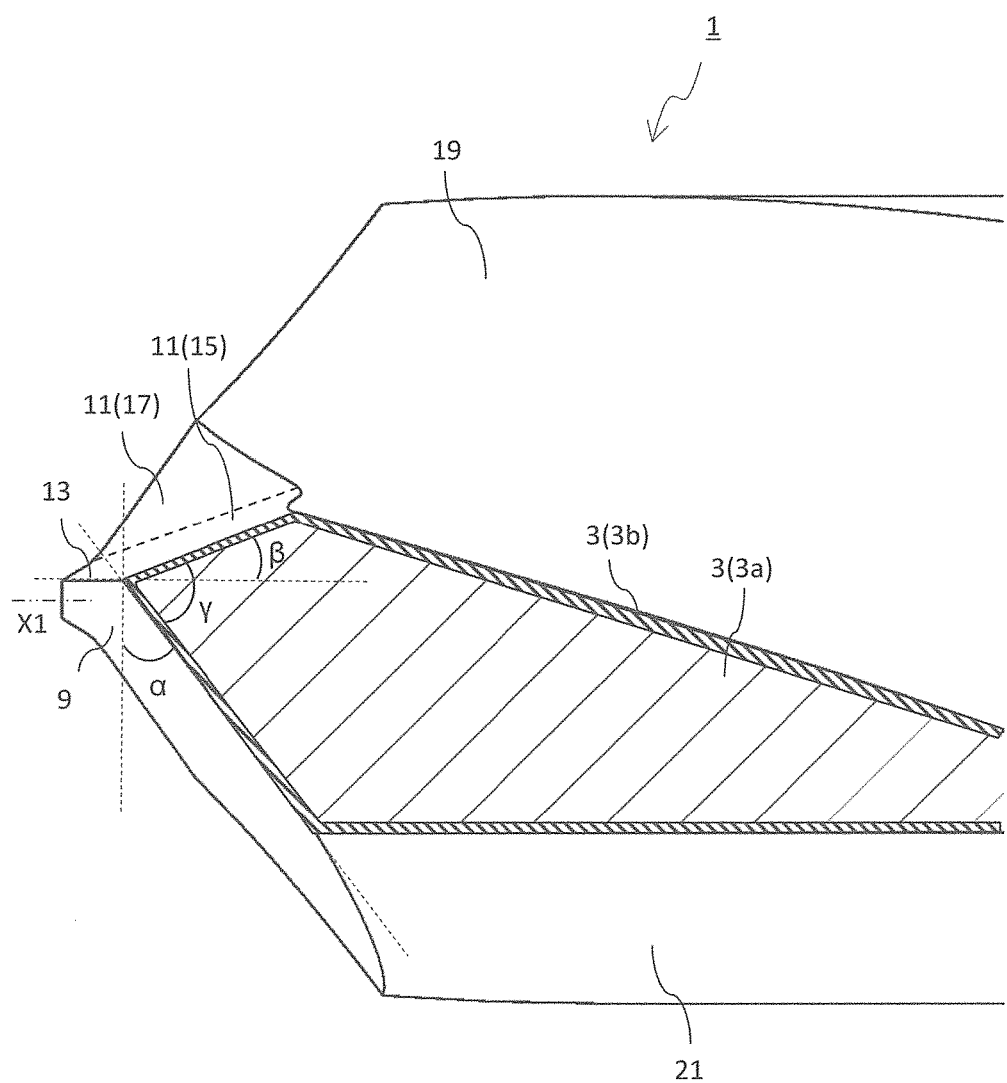
FIG. 7 is a sectional view taken at B2 in the drill illustrated in FIG. 5.

The second surface 11 is located further on a front side in the rotation direction of the body 3 than the major cutting edge 13 because the second surface 11 intersects with the first surface 9 on the front side in the rotation direction of the body 3. Accordingly, as illustrated in FIG. 7, an inclination angle β, namely, a rake angle of the second surface 11 has a negative value in the drill 1 of the present embodiment. When the inclination angle β of the second surface 11 has the negative value, it is possible to increase a thickness of the major cutting edge 13, thereby enhancing durability of the major cutting edge 13.

When the workpiece is a ceramic material, the major cutting edge 13 is likely to be worn because the ceramic material has high hardness. Because the ceramic material is also brittle, chips generated by cutting are not such continuous chips as chips of a metal material, but powdery chips. It is therefore unnecessary to curl the chips by pulling the chips into the second surface 11 as in the case where the workpiece is metal. The inclination angle β of the second surface 11 need not have a positive value.

The inclination angle β of the second surface 11 is evaluable by measuring an angle formed by a target region on the second surface 11 and the central axis X1 when taking a side view from a direction parallel to the target region and orthogonal to the central axis X1.

Figure 6:
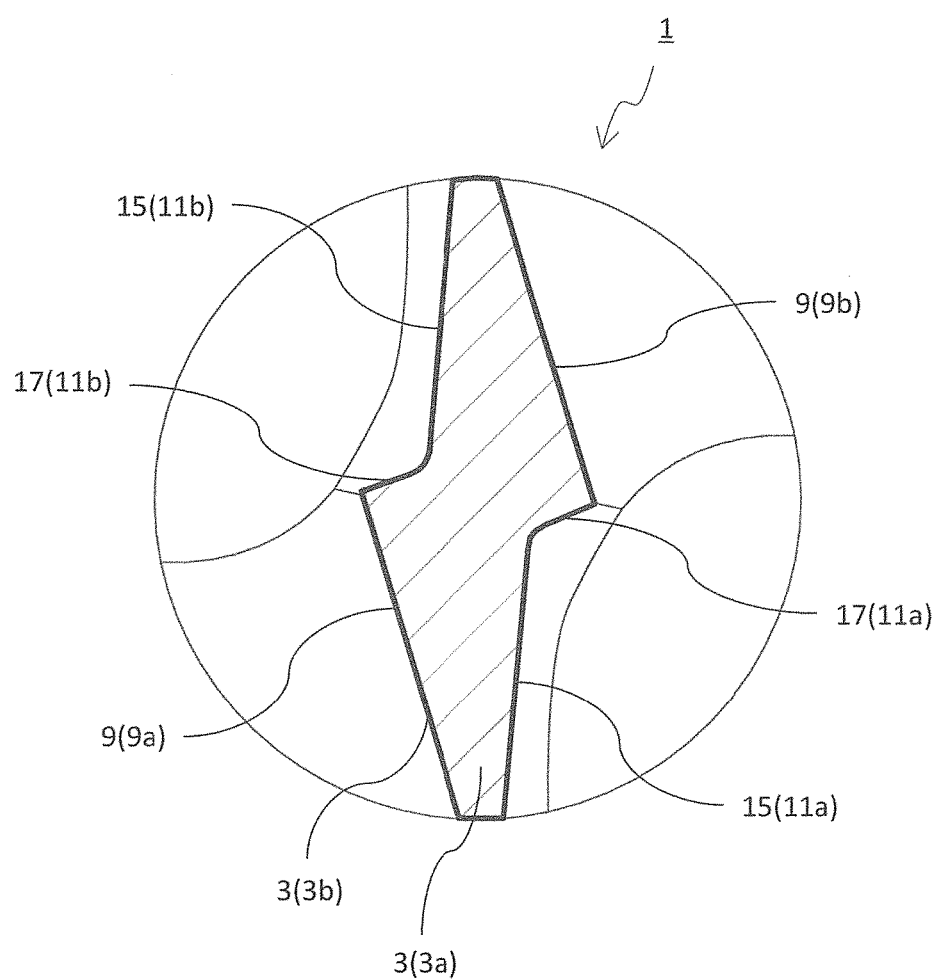
FIG. 6 is a sectional view taken at B1 in the drill illustrated in FIG. 5.

The second surface 11 in the present embodiment is not constituted only by a single flat surface. The second surface 11 includes a first region 15 located along the major cutting edge 13, and a second region 17 located on a front side in the rotation direction with respect to the first region 15. The second region 17 is inclined relative to the first region 15. Hence, the second surface 11 is formed into a concave shape by the first region 15 and the second region 17 in a cross section orthogonal to the central axis X1 as illustrated in FIG. 6.

Chips generated by the major cutting edge 13 are apt to flow toward the second end when the inclination angle β of the second surface 11 has a positive value. However, because the inclination angle β of the second surface 11 has a negative value in the present embodiment, the chips are less apt to flow toward the second end, but can easily flow toward the front side in the rotation direction.

As illustrated in FIG. 2, the second region 17 is inclined relative to the first region 15, and the second surface 11 is formed into the concave shape in the present embodiment. The chips are therefore less likely to excessively flow toward the front side in the rotation direction, but can easily flow toward the second end. This consequently leads to improved chip discharge performance, and the chips are less likely to clog.

The first region 15 and the second region 17 are respectively flat surfaces. A concave curved surface shaped third region, which smoothly connects the first region 15 and the second region 17, is located between the first region 15 and the second region 17. When the second surface 11 includes the third region, the chips are easily smoothly passed from the first region 15 to the second region 17.

An inclination angle of the first region 15 located along the major cutting edge 13 (which is equal to β in FIG. 7) is settable to, for example, −55° to −10°. When the inclination angle of the first region 15 is −55° or more, the chips are less likely to stay in the vicinity of the major cutting edge 13, the second surface 11 and the major cutting edge 13 are less subjected to an excessive temperature rise, and the chips are less likely to return to the vicinity of the major cutting edge 13 and less likely to engage with the major cutting edge 13. When the inclination angle of the first region 15 is −10° or less, the durability of the major cutting edge 13 can be enhanced because it is easy to ensure a thickness of the major cutting edge 13. The inclination angle of the first region 15 is particularly preferably set to −30° to −15°.

An inclination angle α of the first surface 9 located along the major cutting edge 13 is settable to, for example, 15° to 70°. When the inclination angle α is 15° or more, the first surface 9 is less likely to contact the workpiece, and therefore, the first surface 9 and the major cutting edge 13 are less subjected to an excessive temperature rise. When the inclination angle α is 70° or less, the durability of the major cutting edge 13 can be enhanced because it is easy to ensure the thickness of the major cutting edge 13. The inclination angle α of the first surface 9 is particularly preferably set to 25° to 40°.

A holding angle γ indicated by an angle formed by the first surface 9 and the first region 15 in the second surface 11 is settable to, for example, 50° to 130°. When the holding angle γ is set to the above range, the durability of the major cutting edge can be enhanced while avoiding an excessive temperature rise of the first surface 9 and the second surface 11. The holding angle γ is particularly preferably set to 65° to 95°.

In the present embodiment, the inclination angle α remains unchanged at any position in the first surface 9, the inclination angle of the first region 15 remains unchanged at any position in the first region 15, and the holding angle γ remains unchanged at any position in the intersection of the first surface 9 and the first region 15. Alternatively, the inclination angle α, the inclination angle β, and the holding angle γ may be changed, and a region covering 70% or more of the first surface 9 and the first region 15 needs to fall within the above range.

Figure 3:
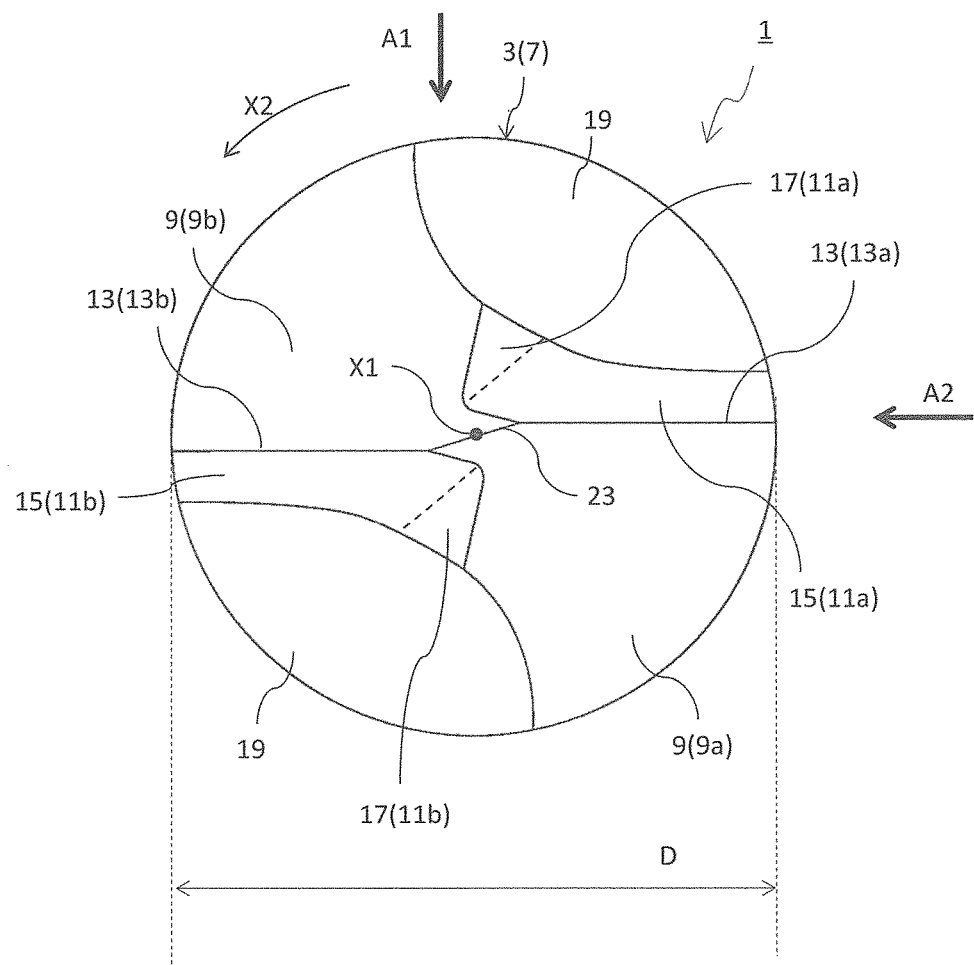
FIG. 3 is a front view when the drill illustrated in FIG. 1 is viewed from a side of a first end.

As illustrated in FIG. 3, the drill 1 may have a configuration that the second region 17 has a larger width as separating from the central axis X1 in a front view from a side of the first end. In this case, variations occur in flow direction of the chips generated by the major cutting edge 13, and a range over which the chips flow is apt to become wider as separating from the central axis X1. The second region 17 thus configured facilitates a stable contact of the chips with the second region 17, thereby facilitating a stable chip flow toward the second end.

The second region 17 may be located away from the major cutting edge 13. In this case, because the second region 17 is inclined relative to the first region 15 as described earlier, an inclination angle of the second region 17 is larger than an inclination angle of the first region 15, in other words, it is designed to have a relatively large rake angle. When the second region 17 is located away from the major cutting edge 13, and the first region 15 is located along the major cutting edge 13, an excessively large rake angle is avoidable in a region of the second surface 11 which is located along the major cutting edge 13, thereby facilitating a smooth chip flow on the second surface 11.

The body 3 in the present embodiment further includes a flute 19 extending from the second surface 11 toward the second end. The flute 19 is a region for discharging the chips of the workpiece cut by the major cutting edge 13 to the outside. Therefore, the flute 19 is located on a side of the second end with respect to the major cutting edge 13, and extends spirally around the central axis X1 toward the second end of the body 3. In order to stably hold the body 3 by the tool machine, the flute 19 is disposed only on the cutting part 7 of the body 3, but not disposed on the holding part 5.

The first region 15 and the second region 17 on the second surface 11 connect to the flute 19 in the present embodiment. This ensures that the chips passing through the first region 15 and the second region 17 flow directly to the flute 19, consequently leading to a stable chip flow to the flute 19.

Figure 4:
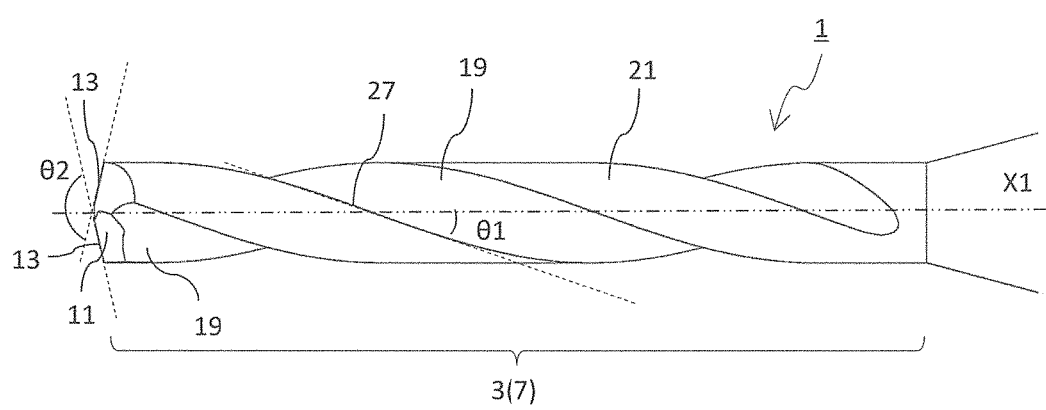
FIG. 4 is a schematic diagram when the drill illustrated in FIG. 3 is viewed from A1 direction.
Figure 5:
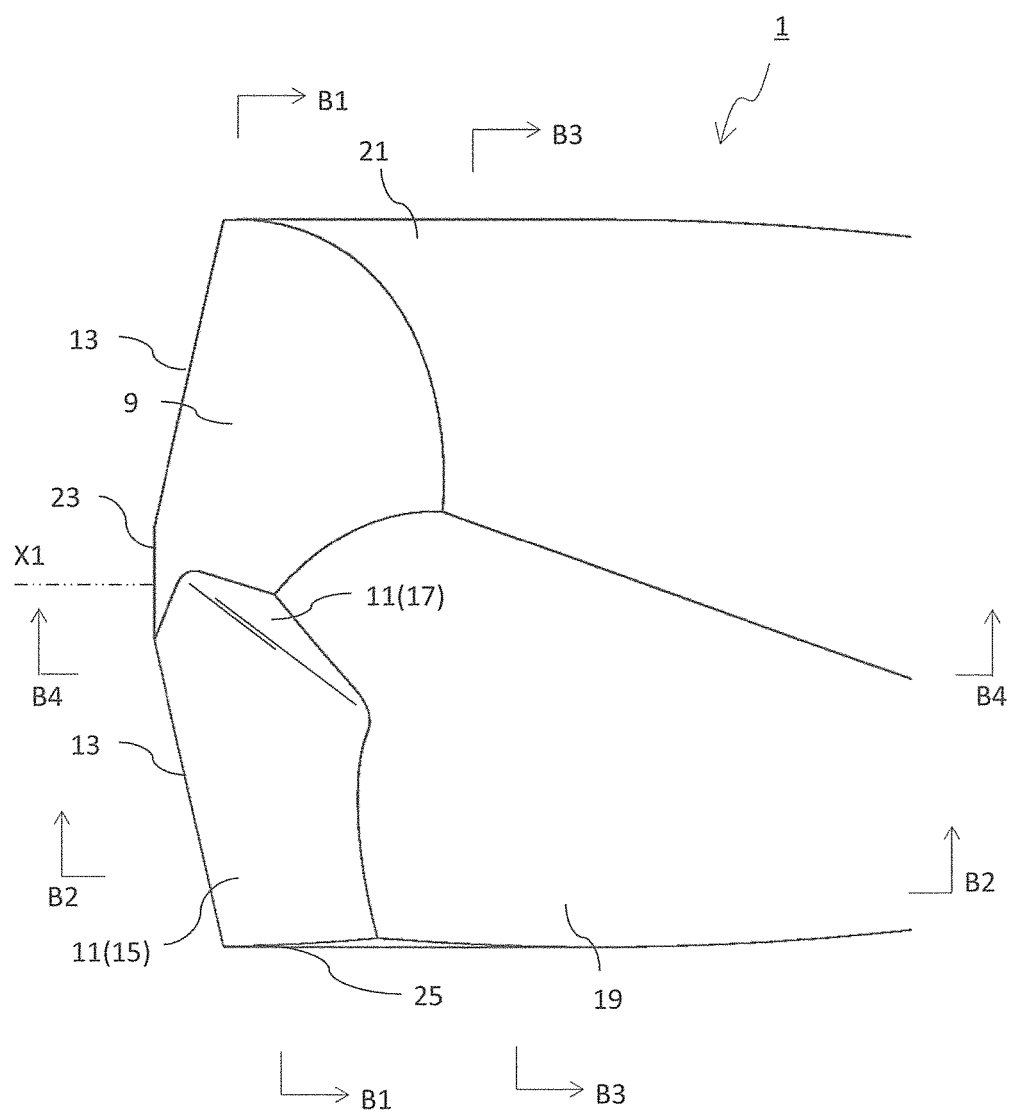
FIG. 5 is an enlarged view of a side of the first end in the drill illustrated in FIG. 4.
Figure 10:
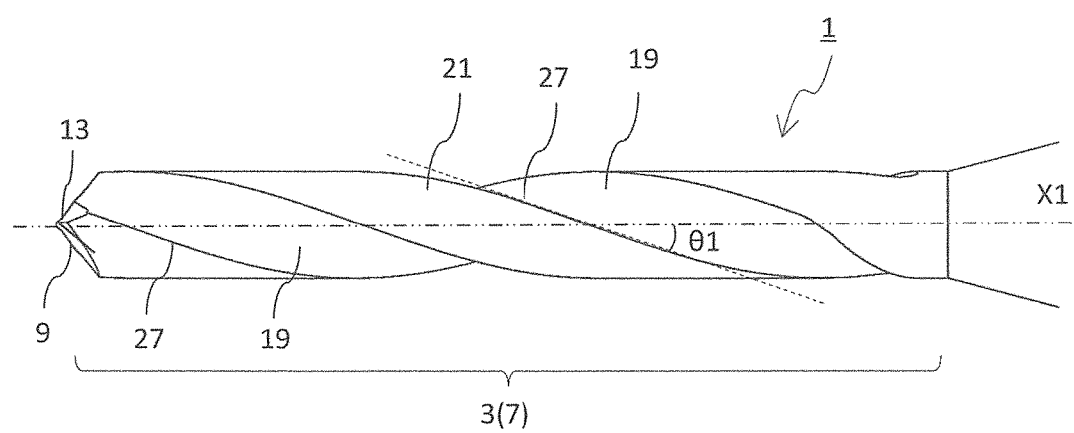
FIG. 10 is a schematic diagram when the drill illustrated in FIG. 3 is viewed from A2 direction.

As illustrated in FIGS. 4 and 10, a helix angle θ1 of the flute 19 in the present embodiment is configured to be constant from a side of the first end to a side of the second end, with no intention of limiting to this configuration. For example, the flute 19 may be configured so that the helix angle at the side of the first end is larger than the helix angle at the side of the second end.

The helix angle θ1 in the present specification denotes an angle formed by a leading edge of land 27 that is a ridge line where the flute 19 intersects with an end portion in a rotation direction X2 of a land surface 21, and an imaginary straight line which passes through a point on the leading edge of land 27 and is parallel to the central axis X1, as illustrated in FIGS. 4 and 10.

An outer circumferential surface of the cutting part 7 is a surface except for portions corresponding to the flute 19 and the like, and a portion located along the flute 19 on a rear side in the rotation direction corresponds to the land surface 21. Although not illustrated, the land surface 21 may include a margin adjacent to the flute 19 on the rear side in the rotation direction, and a body clearance adjacent to the margin.

The margin is formed into a circular arc shape located on an identical circle in a cross section including the central axis X1 and being orthogonal to the central axis X1. A diameter of the identical circle corresponds to an outer diameter of the cutting part 7. The body clearance is a surface formed so as to avoid friction between an outer circumference of the body 3 and a working surface during the cutting process. Therefore, the body clearance has a shorter distance from the central axis X1 than the margin for the purpose of forming a clearance between the body clearance and the working surface.

Figure 8:
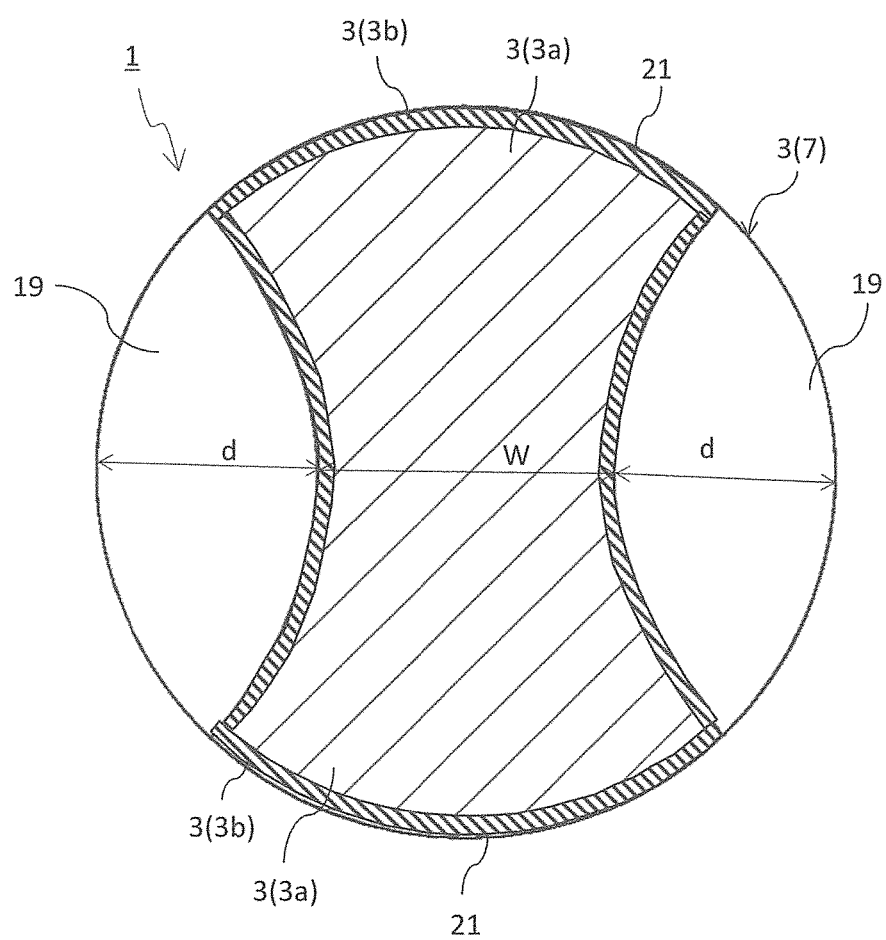
FIG. 8 is a sectional view taken at B3 in the drill illustrated in FIG. 5.
Figure 9:
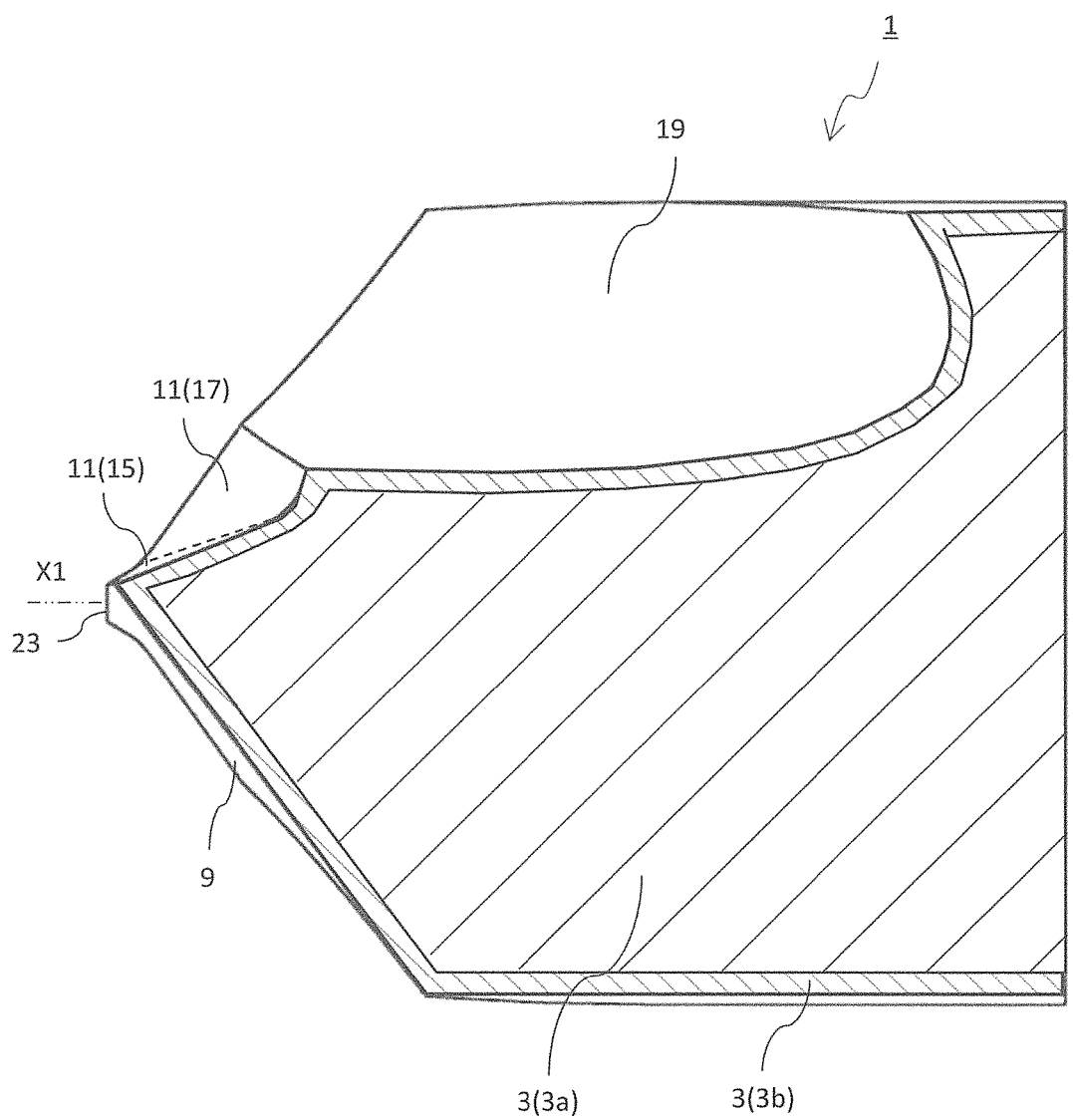
FIG. 9 is a sectional view taken at B4 in the drill illustrated in FIG. 5.

As illustrated in FIG. 8, a depth "d" of the flute 19 is settable to approximately 10-40% of an outer diameter of the cutting part 7. Here, the depth "d" of the flute 19 denotes a value obtained by subtracting a distance between a bottom of the flute 19 and the central axis X1 from a radius of the body 3 in the cross section orthogonal to the central axis X1. Accordingly, a core thickness W, which is a diameter of a web thickness indicated by a diameter of an inscribed circle in the cross section orthogonal to the central axis X1 in the cutting part 7, is settable to 20-80% of an outer diameter D of the cutting part 7. Specifically, for example, when the outer diameter D of the cutting part 7 is 1 mm, the depth "d" of the flute 19 is settable to 0.1-0.8 mm.

The outer diameter of the cutting part 7 is indicated by the diameter D of the body 3 and settable to, for example, 0.05-40 mm in a front view from a side of the first end illustrated in FIG. 3. A length of the cutting part 7 in a direction along the central axis X1 is settable to, for example, approximately 1.5-25 Dmm.

The body 3 in the present embodiment includes a pair of major cutting edges 13. Here, one of the pair of major cutting edges 13 is referred to as a first cutting edge 13a, and the other is referred to as a second cutting edge 13b. The pair of major cutting edges 13a and 13b are disposed at such positions as to have 180° rotational symmetry around the central axis X1 in a front view from a side of the first end. In other words, the pair of major cutting edges 13a and 13b are disposed at such positions as to have point symmetry on the basis of the central axis X1 in the front view from the side of the first end. The drill 1 of the present embodiment, which includes the pair of major cutting edges 13, provides well-balanced cutting as compared with the case of including the single major cutting edge 13.

The body 3 includes the pair of major cutting edges 13, which are therefore respectively provided with two first surfaces 9 and two second surfaces 11. Specifically, the first surface 9 includes a first member 9a located along the first cutting edge 13a, and a second member 9b located along the second cutting edge 13b. The second surface 11 includes a third member 11a located along the first cutting edge 13a, and a fourth member 11b located along the second cutting edge 13b.

The second region 17 in the third member 11a is located between the first region 15 in the third member 11a and the second member 9b, and the second region 17 in the fourth member 11b is located between the first region 15 in the fourth member 11b and the first member 9a in a front view from a side of the first end.

In other words, the first member 9a, the first region 15 in the third member 11a, the second region 17 in the third member 11a, the second member 9b, the first region 15 in the fourth member 11b, and the second region 17 in the fourth member 11b are sequentially located side by side along the rotation direction around the central axis X1 in the front view from the side of the first end.

Because the second region 17 in each of the third member 11a and the fourth member 11b is located as described above, it is less likely that chips flowing toward the front side in the rotation direction in the first region in each of the third member 11a and the fourth member 11b may enter the first surface 9 located on the front side in the rotation direction with respect to the first region 15 in each of the third member 11a and the fourth member 11b. It is therefore less likely that the first surface 9 functioning as a flank surface may be damaged.

Although the drill 1 of the present embodiment includes the two major cutting edges 13, only one major cutting edge 13 may be included, or alternatively three or more major cutting edges 13 may be included.

The body 3 of the present embodiment includes, as an edge, a connection edge 23 and an outer circumferential edge 25 in addition to the major cutting edges 13. The connection edge 23 is an edge region connecting the pair of major cutting edges 13. As illustrated in FIG. 3, the connection edge 23 connects to the pair of major cutting edges 13 in a front view from a side of the first end. Therefore, the major cutting edges 13 are spaced apart with the connection edge 23 interposed therebetween. The connection edge 23 is located at an intersection of the first member 9a and the second member 9b in the first surface 9.

A member subjected to a thinning process for particularly thinning an axial core of the drill 1, namely, a so-called web thickness is disposed at the first end in the body 3. The connection edge 23 is a member of the cutting edge 13 which includes the member subjected to the thinning process, and functions as a so-called chisel edge. A chisel angle θ2 of the chisel edge is settable to 130-170°.

The pair of major cutting edges 13 respectively extend from the connection edge 23 to the outer circumference of the body 3, and connect to the leading edge 27. The leading edge 27 in the present embodiment includes the outer circumferential edge 25 extending from an end connecting to the major cutting edge 13 toward the second end.

The outer circumferential edge 25 is usable for smoothing a machined surface by cutting again a machined wall surface after being cut off by the major cutting edge 13. The outer circumferential edge 25 needs not to be formed over the entirety of the leading edge 27. At least the outer circumferential edge 25 needs to individually connect to the major cutting edge 13, and needs to be formed on at least a side of the first end in the leading edge 27.

The body 3 in the present embodiment includes a base member 3a and a coating layer 3b that coats at least a side of the first end of the base member 3a.

For example, metals, cemented carbide, cermet, and ceramics are usable as a material constituting the base member 3a. Examples of the metals include stainless steel and titanium. Examples of compositions of the cemented carbide include WC (tungsten carbide)-Co (cobalt), WC—TiC (titanium carbide)-Co, WC—TiC—TaC (tantalum carbide)-Co, and Wc—TiC—TaC—$Cr_3C_2$ (chromium carbide)-Co. Here, WC, TiC, TaC, $Cr_3C_2$ are hard particles, and Co is a binding phase.

The cermet is a sintered composite material obtainable by compositing metal into a ceramic ingredient. A specific example of the cermet is one which is composed mainly of a titanium compound, such as titanium carbide (TiC) and titanium nitride (TiN). Examples of the ceramics include $Al_2O_3$, $Si_3N_4$, and cBN (Cubic Boron Nitride).

A material constituting the coating layer 3b is, for example, at least one kind selected from among diamond, diamond-like carbon (DLC), TiC, TiN, TiCN, TiMN (M is at least one kind of metal element selected from among metals belonging to Groups 4, 5, and 6 of the periodic table, except for Ti, and Al and Si), and $Al_2O_3$.

The body 3 may be composed only of the base member 3a. However, when including the coating layer 3b, it is possible to improve wear resistance of the cutting edge 13 located on a side of the first end. Particularly, when the coating layer 3b contains diamond, the drill 1 provides good wear resistance even when the workpiece is a ceramic material.

The coating layer 3b can be deposited by, for example, a vapor phase synthetic method. Examples of the vapor phase synthetic method include chemical vapor deposition (CVD) method or physical vapor deposition (PVD) method. A thickness of the coating layer 3b is settable to, for example, 0.3-20 μm. A suitable range differs depending on a composition of the coating layer 3b.

As described above, the second region 17 in the third member 11a is located between the first region 15 in the third member 11a and the second member 9b, and the second region 17 in the fourth member 11b is located between the first region 15 in the fourth member 11b and the first member 9a in the drill 1 of the present embodiment. Therefore, the chips are less likely to enter the first surface 9 functioning as the flank surface. Consequently, the coating layer 3b located on the first surface 9 functioning as the flank surface is less likely to be worn, thereby enhancing the durability of the drill 1.

Owing to the fact that the second surface 11 includes the second region 17, it is possible to increase the angle θ3 at which the second region 17 in the third member 11a intersects with the second member 9b, and the angle θ4 at which the second region 17 in the fourth member 11b intersects with the first member 9a. Even if the coating layer 3b flakes off on the second surface 11, the flake growth is apt to stop at the above-mentioned intersection, thus making it easier to avoid the flaking of the coating layer 3b in the first member 9a and the second member 9b. It is therefore possible to enhance the durability of the connection edge 23 located at the intersection of the first member 9a and the second member 9b.

<Method of Manufacturing Machined Product>

A method of manufacturing a machined product in an embodiment is described in detail below by exemplifying the case of using the drill 1 in the foregoing embodiment. The method is described below with reference to FIGS. 11 to 13. Portions on a side of the second end of the holding part 5 in the drill 1 are omitted in FIGS. 11 to 13.

The method of manufacturing a machined product in the present embodiment includes the following steps (1) to (4).

Figure 11:
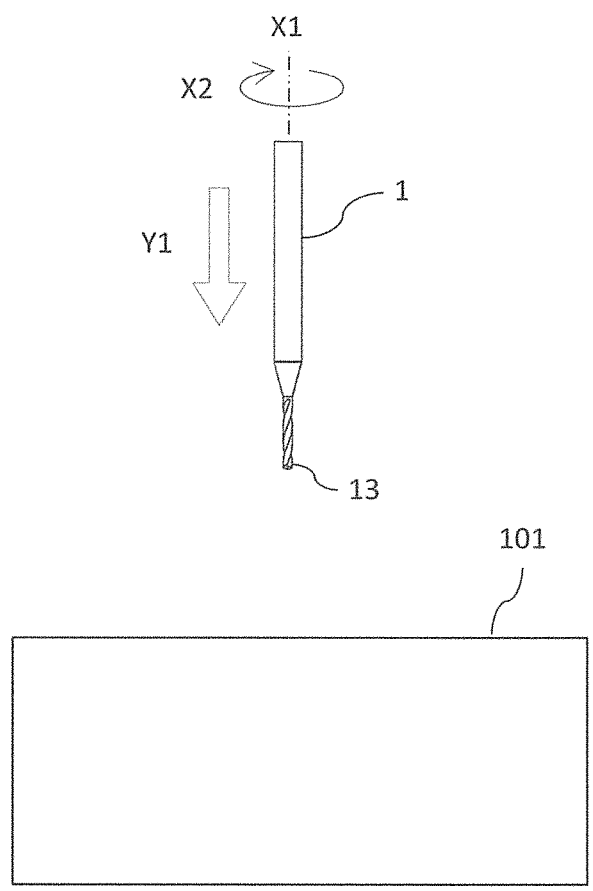
FIG. 11 is a schematic diagram illustrating a step in a method of manufacturing a machined product in an embodiment.

(1) The step is to dispose the drill 1 above a prepared workpiece 101 (refer to FIG. 11).

(2) The step is to bring the drill 1 near the workpiece 101 in Y1 direction while rotating the drill 1 in an arrow X2 direction around the central axis X1 (refer to FIG. 11).

This step may be carried out by, for example, fixing the workpiece 101 onto a table of a machine tool having the drill 1 attached thereto, and then bringing the drill 1 being rotated near the workpiece 101. In this step, the workpiece 101 and the drill 1 need to be brought near each other. For example, the workpiece 101 may be brought near the drill 1.

Figure 12:
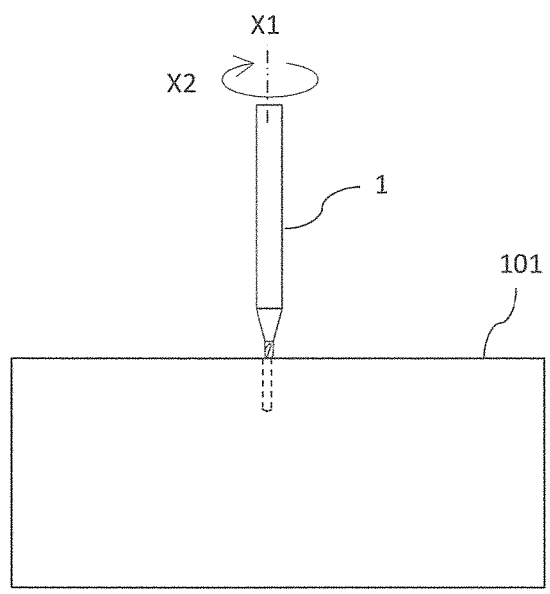
FIG. 12 is a schematic diagram illustrating a step in the method of manufacturing a machined product in the embodiment.

(3) The step is to form a drilled hole 103 (through hole) in the workpiece 101 by bringing the drill 1 nearer the workpiece 101 so that the pair of major cutting edges of the drill 1 being rotated are brought into contact with a desired position on a surface of the workpiece 101 (refer to FIG. 12).

In this step, the connection edge and the outer circumferential edge in addition to the pair of major cutting edges are also brought into contact with the desired position on the surface of the workpiece 101.

Also in this step, from the viewpoint of obtaining a good machined surface, it is preferable to make a setting so that a partial region on a side of the second end in the cutting part of the drill 1 does not penetrate the workpiece 101. That is, excellent chip discharge performance is producible via the partial region by making the partial region function as a region for discharging chips.

Figure 13:
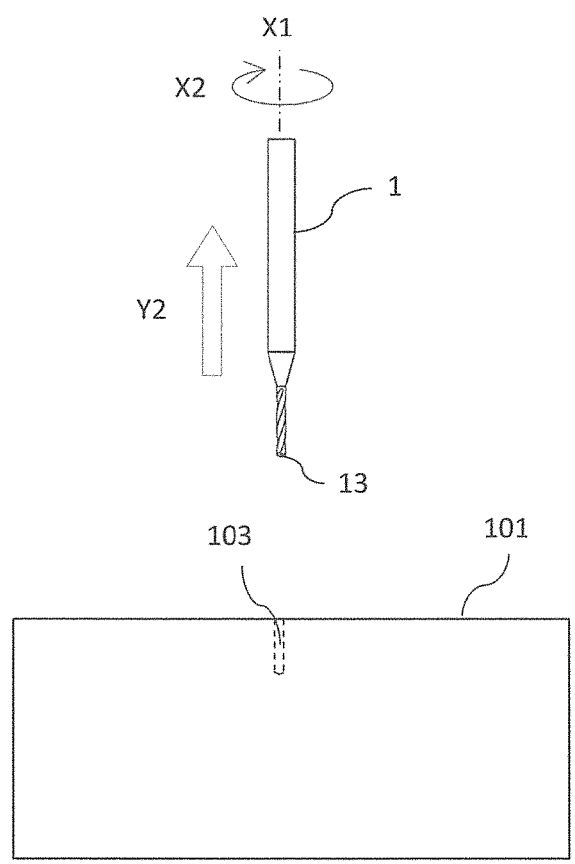
FIG. 13 is a schematic diagram illustrating a step in the method of manufacturing a machined product in the embodiment.

(4) The step is to move the drill 1 away from the workpiece 101 in Y2 direction (refer to FIG. 13).

Also in this step, the workpiece 101 and the drill 1 need to be kept away from each other as is the case with the above step (2). For example, the workpiece 101 may be moved away from the drill 1.

Excellent drilling performance can be provided through the foregoing steps.

When the cutting process of the workpiece 101 as described above is carried out a plurality of times, specifically for example, when a plurality of drilled holes 103 are formed in the single workpiece 101, it is necessary to repeat the step of bringing the pair of major cutting edges of the drill 1 into contact with different portions of the workpiece 101 while keeping the drill 1 rotating.

While the drills in the several embodiments have been described and illustrated above, the present invention is not limited thereto. It is, of course, possible to make any arbitrary ones insofar as they do not depart from the gist of the present invention.

DESCRIPTION OF REFERENCE NUMBERS 1 drill
3 body
3a base member
3b coating layer
5 holding part
7 cutting part
9 first surface (flank surface)
9a first member
9b second member 11 second surface (rake surface)
11a third member
11b fourth member
13 cutting edge (major cutting edge)
13a first cutting edge
13b second cutting edge
15 first region
17 second region
19 flute
21 land surface
23 connection edge
25 outer circumferential edge
27 leading edge
101 workpiece
103 drilled hole (through hole)

What is claimed is:

1. A drill, comprising:
a bar-shaped body extending from a first end to a second end and being rotatable around a central axis, wherein the body comprises:
   a first surface located at the first end;
   a second surface intersecting with the first surface on a front side in a rotation direction of the body; and
   a first cutting edge located in at least a part of an intersection of the first surface and the second surface,
the second surface has a concave shape in a cross section orthogonal to the central axis and comprises:
   a first region located along the first cutting edge and having a flat surface; and
   a second region located on the front side in the rotation direction with respect to the first region, inclined with respect to the first region and having a flat surface, and
   the second region has a larger width as separating from the central axis in a front view of the first end.

2. The drill according to claim 1, wherein the second region is spaced apart from the first cutting edge.

3. The drill according to claim 1, wherein
the body further comprises a flute extending from the second surface toward the second end, and
the first region and the second region connect to the flute.

4. The drill according to claim 1, wherein
the body further comprises:
   a third surface located at the first end;
   a fourth surface intersecting with the third surface on the front side in the rotation direction; and
   a second cutting edge located in at least a part of an intersection of the third surface and the fourth surface,
the fourth surface has a concave shape in a cross section orthogonal to the central axis and comprises:
   a third region located along the second cutting edge and having a flat surface; and
   a fourth region located on the front side in the rotation direction with respect to the third region, inclined with respect to the third region and having a flat surface, and
the second region is located between the first region and the third surface, and the fourth region is located between the third region and the first surface, in a front view of the first end.

5. The drill according to claim 1, wherein the body comprises a base member and a coating layer that coats at least a part of the base member which is located at a side of the first end.

6. The drill according to claim 5, wherein the coating layer contains diamond.

7. The drill according to claim 1, wherein the first cutting edge comprises a chisel edge intersecting with the central axis in a side view.

8. A method of manufacturing a machined product, comprising:
rotating a drill according to claim 1;
bringing the drill being rotated into contact with a workpiece; and
moving the drill being rotated away from the workpiece.

* * * * *